United States Patent [19]

Spiering et al.

[11] Patent Number: 4,886,300

[45] Date of Patent: Dec. 12, 1989

[54] IMPROVEMENTS IN AND RELATING TO CONNECTION ASSEMBLIES AND COMPONENTS THEREOF

[75] Inventors: Michael W. Spiering, Aberdeen; Michael T. Cunningham, Udny Green, both of Scotland

[73] Assignee: Hunting Oilfield Services Limited, Aberdeen, Scotland

[21] Appl. No.: 230,372

[22] Filed: Aug. 10, 1988

[30] Foreign Application Priority Data

Aug. 12, 1987 [GB] United Kingdom ............... 8719074

[51] Int. Cl.⁴ ............................................. F16L 35/00
[52] U.S. Cl. ........................................ 285/26; 285/39;
285/315; 285/320; 285/379; 285/920
[58] Field of Search ................... 285/26, 29, 31, 39,
285/379, 137.1, 319, 320, 920, 315

[56] References Cited

U.S. PATENT DOCUMENTS

| | | | |
|---|---|---|---|
| 3,174,806 | 3/1965 | Barba et al. | 285/31 X |
| 3,481,396 | 12/1969 | Williams et al. | |
| 3,591,204 | 7/1971 | Ships | 285/26 |
| 3,776,575 | 12/1973 | Gilvar et al. | 285/26 X |
| 4,019,334 | 4/1977 | Sinclair et al. | |
| 4,494,775 | 1/1985 | Nash et al. | 285/26 |
| 4,664,419 | 5/1987 | Tan et al. | 285/31 |
| 4,741,402 | 5/1989 | Smith | 285/26 X |

FOREIGN PATENT DOCUMENTS 1318838 5/1973 United Kingdom .

Primary Examiner—Dave W. Arola
Attorney, Agent, or Firm—Watson, Cole, Grindle & Watson

[57] ABSTRACT

Apparatus for use in remotely connecting a plurality of lines for carrying fluid terminating in a first hub to a plurality of lines for carrying fluid terminating in a second hub, the hubs being initially arranged with their axes approximately coaxial but spaced apart, comprises a plurality of first engagement members fixed relative to the first hub and comprising generally conical receptor elements forming end portions of elongate tubular members arranged around the first hub with their axes generally parallel to that of the first hub, and a plurality of second engagement members comprising generally conical elements forming end portions of elongate members arranged around the second hub with their axes generally parallel to that of the second hub. The second engagement members are slidably received in guide sleeves fixed to the second hub, the engagement members being movable relative to the guide sleeves between extended positions in which the conical elements are received in and engage the conical receptors to axially align the hubs, and retracted positions. Latch means are mounted on the second engagement members for latching the first and second engagement members together when engaged so that retraction of the second engagement members will juxtapose the hubs.

The apparatus also includes clamp means for clamping the juxtaposed ends of the hubs together. A seal plate carrying seals for sealing the connections of the fluid lines in the hubs may be inteposed between the end connection faces of the hubs before they are clamped together.

30 Claims, 18 Drawing Sheets

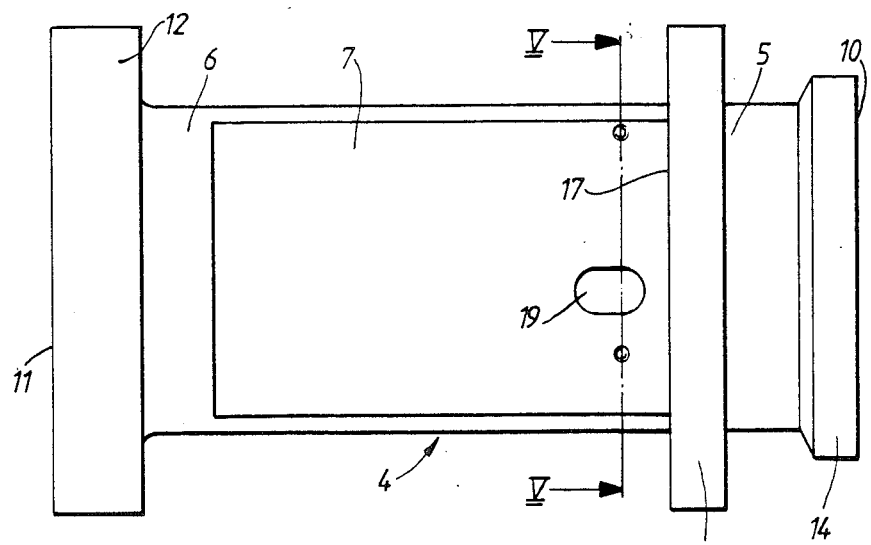
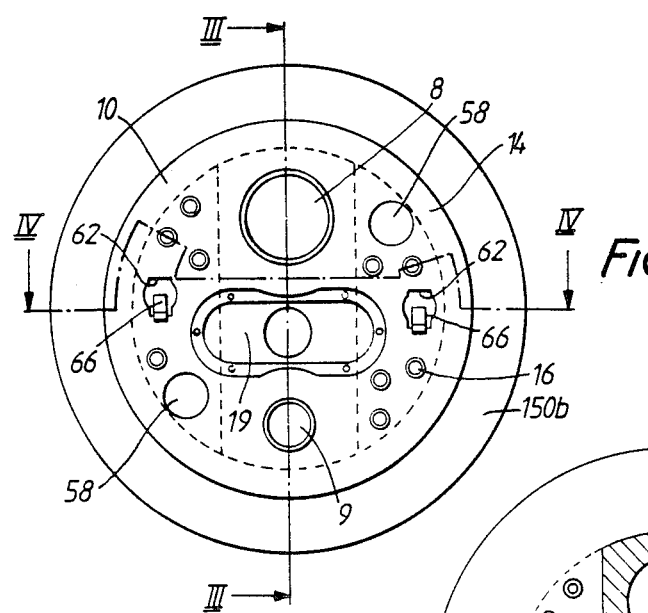
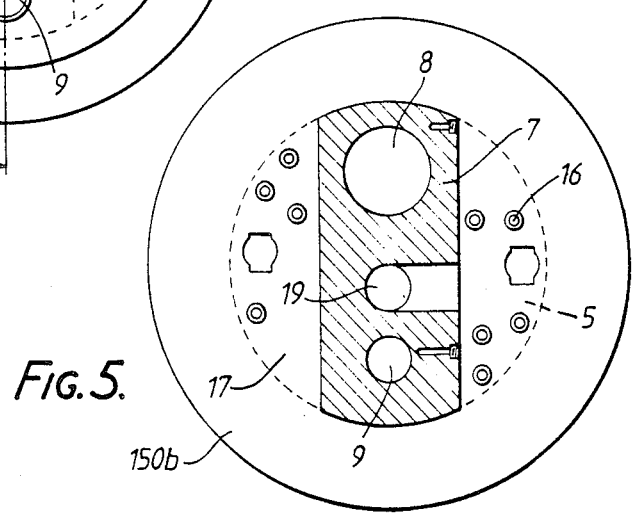
FIG. 1.
FIG. 2.
FIG. 5.

IMPROVEMENTS IN AND RELATING TO CONNECTION ASSEMBLIES AND COMPONENTS THEREOF

FIELD OF THE INVENTION

The present invention relates to an assembly and the components thereof for connecting together fluid carrying and/or electrical lines of two adjacent sub-sea assemblies, such as for example a Christmas Tree (CT) and a fluid control module or assembly of modules (FCM) mounted adjacent the CT.

SUMMARY OF THE INVENTION

According to the present invention there is provided apparatus for use in connecting a plurality of lines for carrying fluid terminating in a first hub to a plurality of lines for carrying fluid terminating in a second hub, the hubs being initially arranged with their axes approximately coaxial and spaced apart, comprising a plurality of first engagement members arranged around and fixed relative to the first hub, a plurality of second engagement members arranged around and associated with the second hub, the second engagement members being movable relative to the second hub in the direction of the axis thereof between an extended position for engaging the first engagement members and a retracted position, the engagement members being adapted such that engagement of the first engagement members with the second engagement members causes alignment of the engagement members and of the hubs associated therewith, means for moving the second engagement members between their operative and inoperative positions, and latch means for latching the engaged engagement members together so that retraction of the second engagement members causes the hubs to be juxtaposed.

The engagement members preferably comprise a plurality of generally conical or tapering elements, which may form end portions of elongate members arranged around one hub with their axes generally parallel to that of the hub, and a plurality of generally conical or tapering receptor elements for receiving the conical elements, and which may form end portions of elongate members arranged around the other hub with their axes generally parallel to that of the other hub.

The elongate members associated with one of the hubs may be received in guide sleeves fixed relative to that hub and slidable relative thereto between the retracted and extended positions.

Preferably, seals for sealing the connections of the fluid carrying lines in the hubs are carried by a separate seal plate means which is interposed between the end connection faces of the hubs.

One hub and its associated sub-sea assembly, e.g. the FCM, may carry all the means requiring operation for bringing the ends of the hubs together and for clamping them together, the means associated with the other hub being passive.

One hub may be supported on its associated sub-sea assembly, e.g. the CT, in such a way as to be movable relative thereto to accommodate misalignment of the hubs arising from manufacturing and installation tolerances. Initially this hub may be restrained axially relative to its associated sub-sea assembly by means which are releasable in the course of its alignment and juxaposition relative to the other hub.

One sub-sea assembly and/or its associated hub may carry clamp means for clamping the ends of hubs together, when juxtaposed, with the interposition of the seal plate means, if provided. The clamp means may be mounted relative to the one sub-sea assembly such that it can move to a limited extent axially and/or transversely of the hub. The clamp means is normally aligned with the end connection face of the one hub in a position to be engaged thereabout.

An embodiment according to the present invention will now be described, by way of example only, with reference to the accompanying drawings.

BRIEF DESCRIPTION OF THE DRAWINGS

FIG. 1 is a side elevation of an embodiment of a hub according to the present invention;

FIG. 2 is an end view of the hub of FIG. 1;

FIGS. 3, 4 and 5 are sections on the lines 111—111 and 1V—1V of FIG. 2 and V—V of FIG. 1, respectively;

DESCRIPTION OF THE PREFERRED EMBODIMENTS

Figure 3:
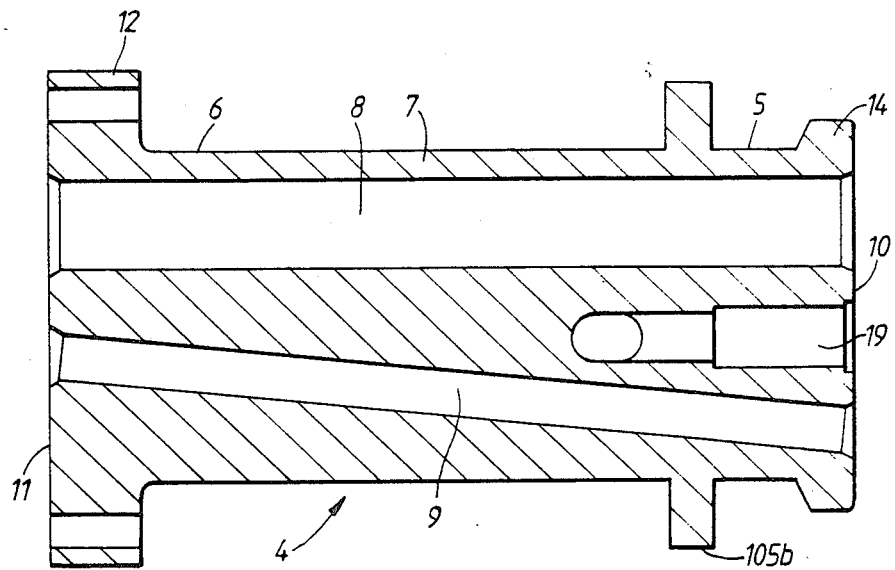
Figure 4:
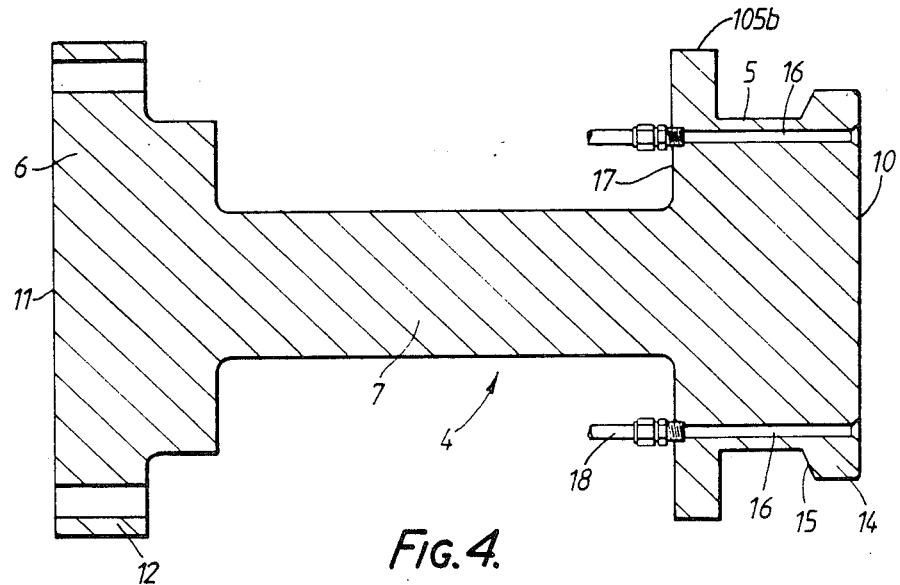
Figure 6:
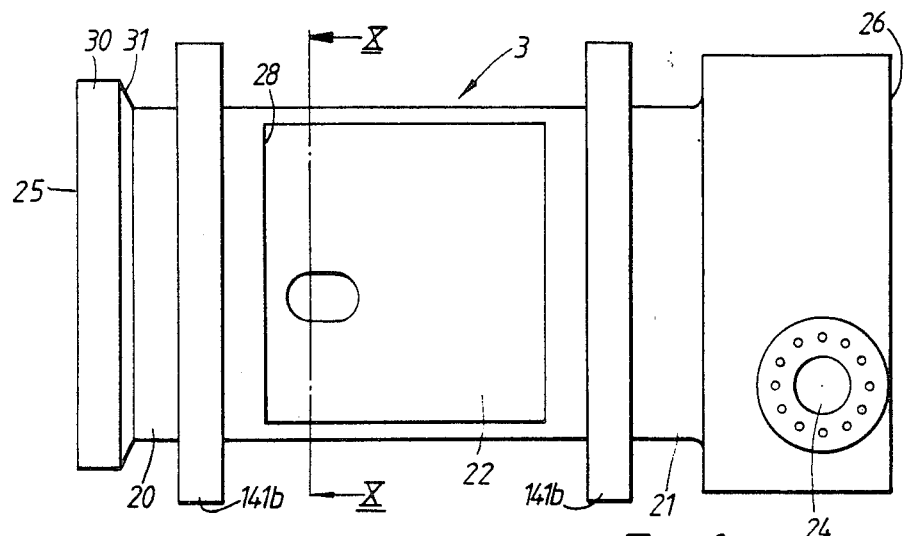
FIG. 6 is a side elevation of an embodiment of another hub according to the present invention.
Figure 7:
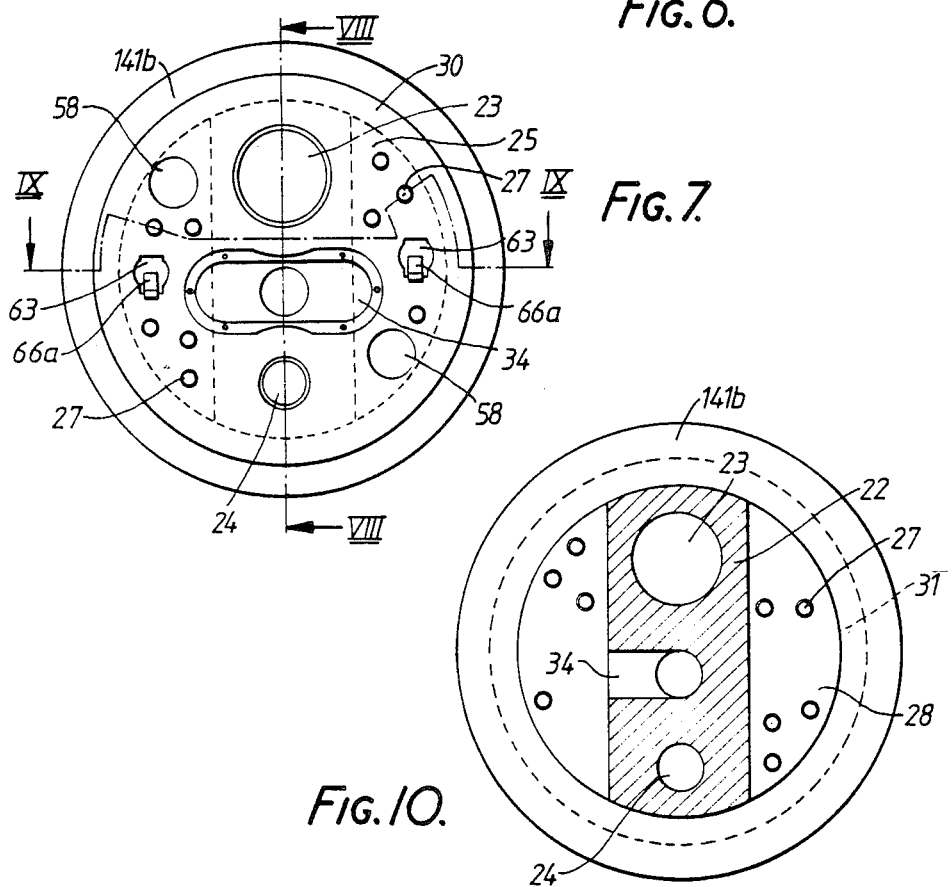
FIG. 7 is an end view of the hub of FIG. 6.
Figure 10:
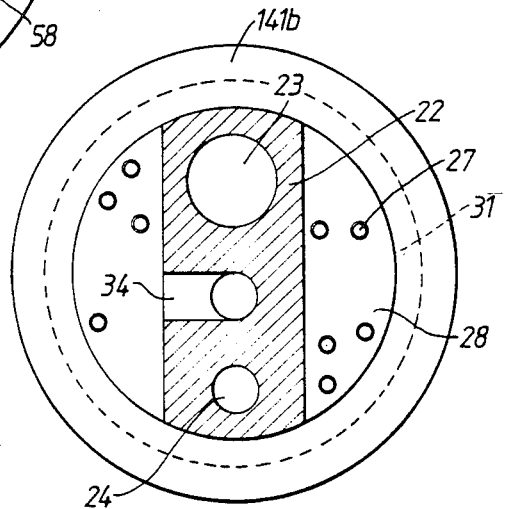
FIGS. 8, 9 and 10 are sections on the lines V111—V111 and 1X—1X of FIG. 7 and X—X of FIG. 6, respectively.
Figure 8:
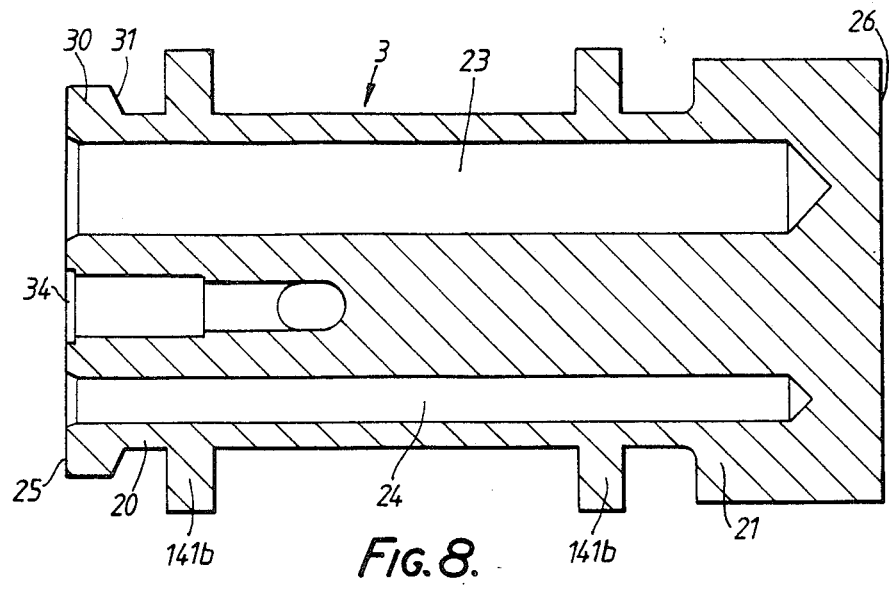
Figure 9:
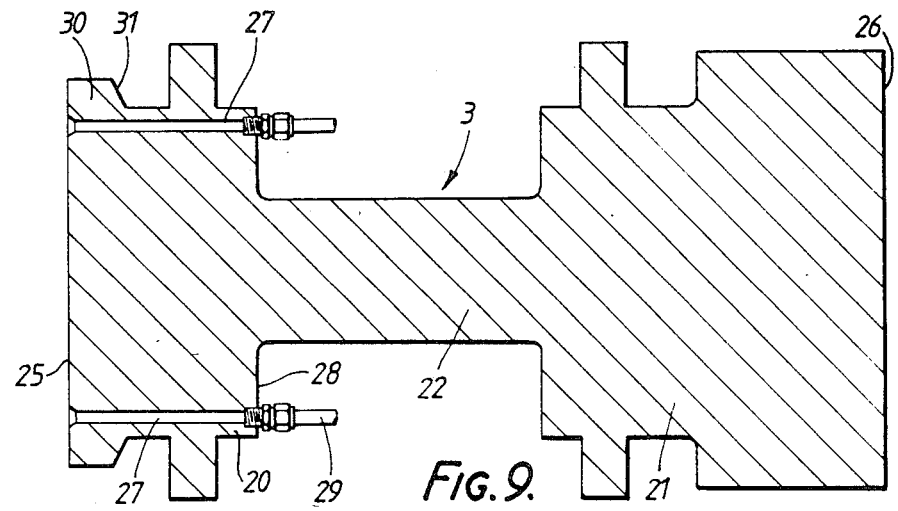
Figure 11:
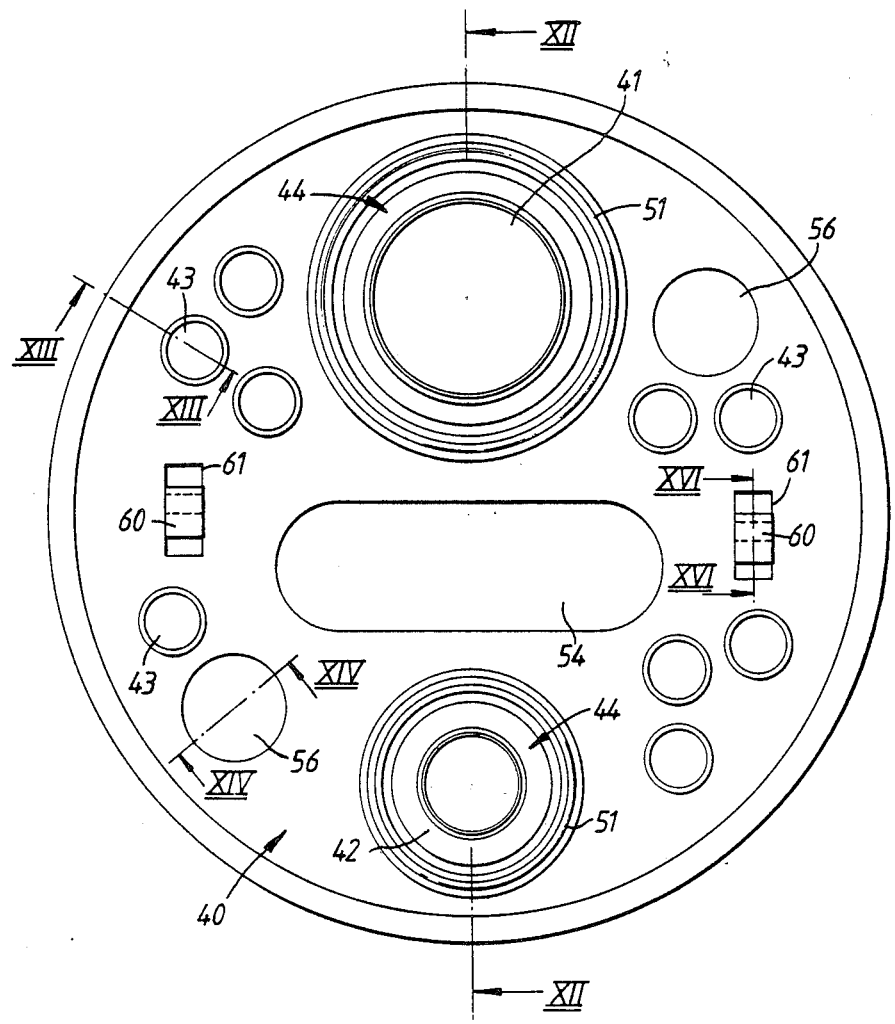
FIG. 11 is an enlarged end view of an embodiment of a seal plate means according to the present invention.
Figure 13:
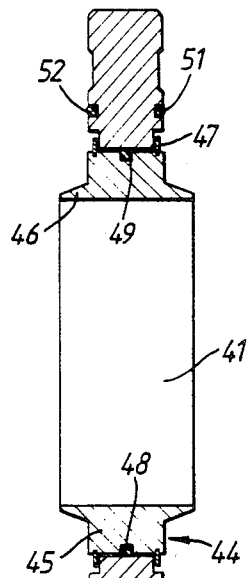
FIGS. 12, 13 and 14 are enlarged sections on the lines X11—X11, X111—X111, and X1V—X1V of FIG. 11.
Figure 13:
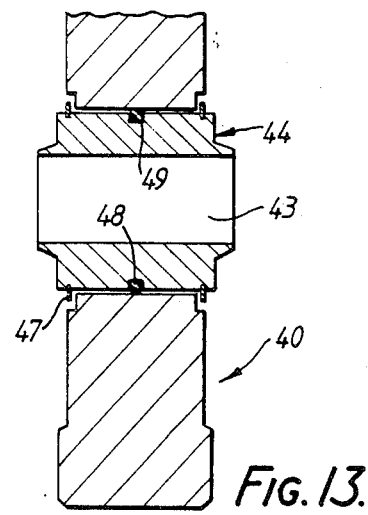
Figure 12:
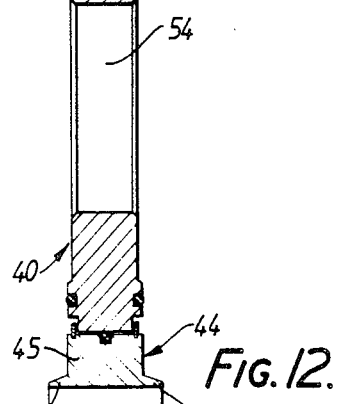
Figure 14:
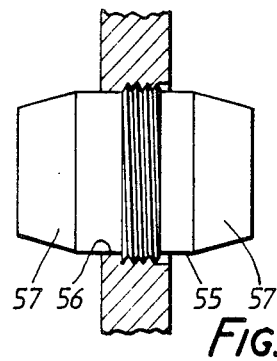
Figure 15:
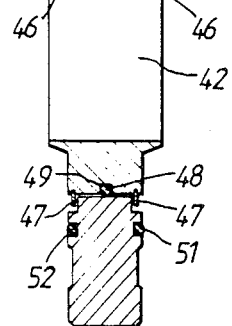
FIG. 15 is an enlarged end view of a seal used in the seal plate means of FIG. 11.
Figure 15:
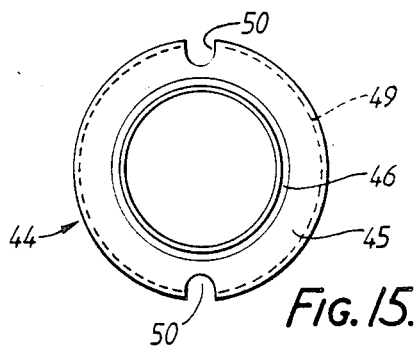

The assembly shown in the drawings is for connecting the process fluid, control fluid and electrical lines of one sub-sea assembly, as shown a Christmas Tree (CT) 1, with those of another adjacent sub-sea assembly, as shown a fluid control module or assembly of modules (FCM) 2 which is mounted beside the CT and has a predetermined fixed position relative to the CT within manufacturing and installation tolerances. The fluid lines of the CT are connected to a laterally projecting CT hub 3 arranged with its axis generally horizontal, which is movable to a limited extent relative to the CT and is supported in a manner permitting this limited movement on the CT 1. The fluid lines of the FCM 2 are connected to a laterally projecting FCM hub 4 arranged with its axis generally horizontal, fixed to the FCM and for connection to the CT hub. Initially the hubs 3, 4 are arranged with their free end connection faces a certain distance apart and the two hubs may not be exactly axially aligned. As will be described hereafter, the FCM 2 or FCM hub 4 supports engagement means operated from the FCM and movable relative thereto between a retracted position and an extended position in which they engage with passive engagement means fixed relative to the CT hub 3 for moving the CT hub 3 into axial alignment with the FCM hub 4 and which can be latched together so that retraction of the engagement means associated with the FCM hub 4 will bring the CT hub 3 into juxtaposition with the FCM hub 4. Clamp means also operated from the FCM are provided for clamping the ends of the two hubs 3, 4 together. Conveniently, seal plate means carrying all the required seals for sealing between the ends of the fluid lines is interposed between the end connection faces of the hubs. The fluid and electrical connections between the CT and FCM are thus made remotely and may be made with or without the intervention of ROVs.

The FCM hub 4 (FIGS. 1 to 5) is preferably made of a single forging and is generally elongate with generally cylindrical end portions 5, 6 and an intermediate portion 7 having a smaller, generally rectangular section having one dimension equal to the diameter of the end portions 5, 6. At least one bore, and as shown two bores 8, 9, for process fluid extend the length of the hub and open at the end faces 10, 11 of the end portions 5, 6. One end portion 6 is fixed to the FCM and may be provided with an apertured flange 12 for bolting to the FCM. The end face 11 of this end portion 6 may be generally planar and the opening of each bore 8, 9 in the face 11 is associated with a seal for sealing between the ends of bores 8, 9 and the ends of corresponding process fluid ducts in the FCM. The opening of each bore may for example be surrounded by a recess for receiving a seal or, as shown, the end of each bore may be frusto-conical to receive an AX type metal seal. The other end portion 5 is for connection to the end of the CT hub and has a flange 14, having a frusto-conical rear surface 15, for engagement by the clamp means. End portion 5 also has a plurality of smaller bores 16 for control fluid which extend between the end connection face 10 and an oppositely directed face 17 of the end portion 5 where they are connected to high pressure tubing 18, for example by ferrule lock connections, connected to control fluid ducts in the FCM. The end connection face 10 is generally planar and each of the fluid ducts 8, 9 and 16 opens into the end face 10 in a frusto-conical portion for receiving a seal. The end portion 5 also has a generally central recess 19 which opens at one end into the end face 10 and at the other end laterally of the intermediate portion 7, for receiving part of an inductive coupling.

The CT hub 3 (FIGS. 6 to 10) is also preferably made of a single forging and has a construction similar to that of the FCM hub with a cylindrical end portion 20 for connection to the corresponding end of the FCM hub 4, an end portion 21 and an intermediate portion 22 of reduced, generally rectangular section. Two bores 23, 24 for process fluid, corresponding to bores 8, 9, extend from end connection face 25 of end portion 20 the length of the hub. The end portion 20 also has control fluid bores 27 corresponding to the bores 16 of the FCM hub 4 and which open into the end face 25 and into an oppositely directed face 28 of the end portion 20 where they are connected to flexible high pressure tubing 29 connected to the CT. The end portion 20 also has a flange 30 corresponding to flange 14 with a similar frusto-conical rear face 31 for engagement by the clamp. All of the bores 23, 24 and 27 open into the end face 25 in frusto-conical recesses. A central recess 34, corresponding to recess 19 and for the other half of the inductive coupling, is also provided in end portion 20.

The other ends of the process fluid bores 23, 24 may open into the end face 26 of end portion 21, which may terminate in a circular flange, or may open laterally into lateral faces of end portion 21, which then conveniently terminates in a polygonal flange. These ends of bores 23, 24 are connected to separate process fluid lines 32, for example by bolted flanges, the process fluid lines 32 being connected to the CT. Seals are provided in the appropriate face of portion 21 surrounding each process fluid bore opening.

The end faces 10, 25 of the FCM and CT hubs, 4, 3 are intended to be clamped together with the interposition of a seal plate 40 (FIGS. 11 to 16) which carries all the seals required for sealing the various fluid carrying bores together with means for ensuring correct alignment and orientation of the hubs with the seal plate and for retaining the seal plate on one of the hubs when the hubs are spaced apart. The seal plate 40 is generally planar with a diameter corresponding to the diameter of the end faces 10, 25 of the hubs and openings 41, 42 and 43 corresponding to the bores 8, 23, 9, 24 and 16, 27 in the end portions 5, 20 of the hubs 4, 3. The openings 41, 42 and 43 are provided with AX type seals 44 which are arranged so that they float to a limited extent in the openings. Each seal has a generally cylindrical body 45 with tapered end portions 46 for contacting and sealing against the frusto-conical ends of the ducts in the hubs. Each seal 44 is loosely retained in the seal plate by snap rings 47 engaged with the seal and which overlie each of the faces of the seal plate, and is centered by an elastomeric O-ring 48 held captive in a groove 49 in the seal body. For pressure testing purposes, the body 45 of each seal has at least one, as shown two, external axial grooves 50 permitting fluid to flow from one face of the seal plate to the other. Each of the openings 41 and 42 is also surrounded in each face of the seal plate by a dovetail groove 51 receiving an elastomeric O-ring 52. The seal plate 40 is provided with a central opening 54 corresponding to recesses 19 and 34 in the hubs for permitting the two parts of the inductive coupling in the hubs to meet.

The means for ensuring alignment and correct orientation of the hubs with each other and the seal plate, comprise at least one, as shown two, dowel pins 55 (FIG. 14) which are threaded into or otherwise engaged in openings 56 in the seal plate and project from both faces of the seal plate. The end portions 57 of the dowel pins are frusto-conical to facilitate their insertion into corresponding blind bores 58 in the end faces 10, 25 of the hubs.

Figure 16:
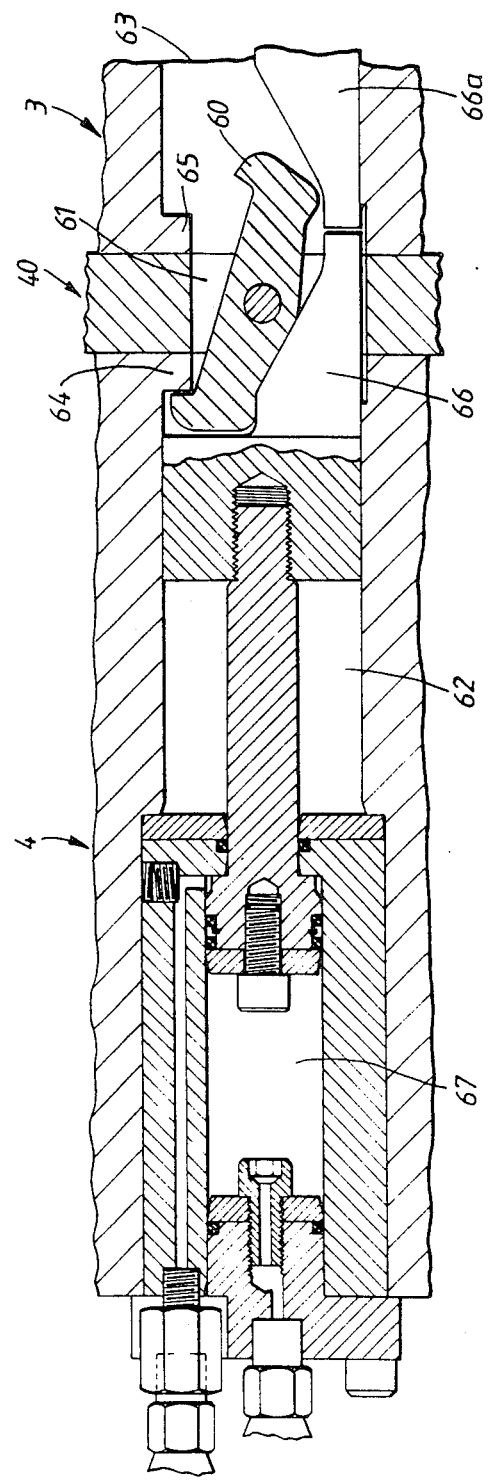
FIG. 16 is a section through the seal plate means of FIG. 11 on the line XV1—XV1 of FIG. 11 and through corresponding portions of the hubs of FIGS. 1 and 6.
Figure 17:
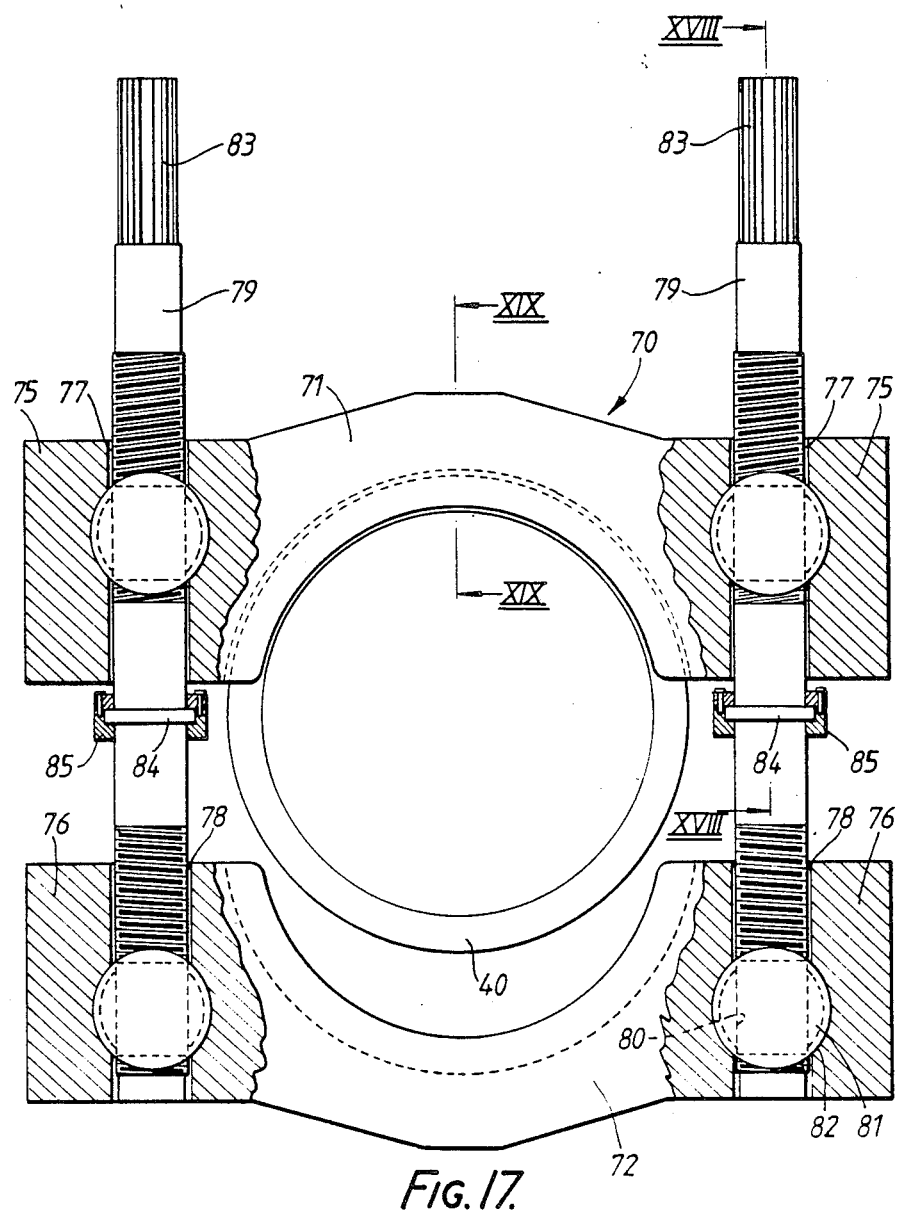
FIG. 17 is a part section part elevation through an embodiment of clamp means according to the present invention, showing the upper part of the clamp means in its clamped position and the lower part in its unclamped position.
Figure 18:
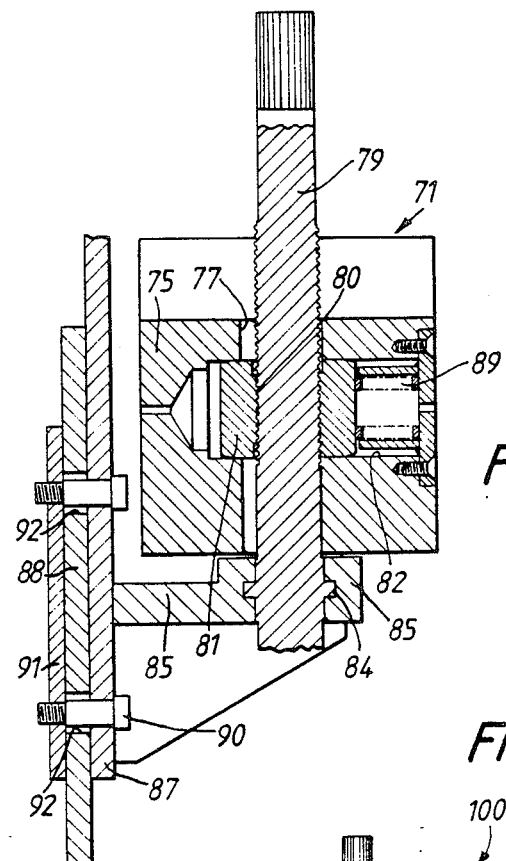
FIGS. 18 and 19 are sections on the lines XV111—XV111 and X1X—X1X, respectively, of FIG. 17, FIG. 18 also showing support means for the clamp means.
Figure 19:
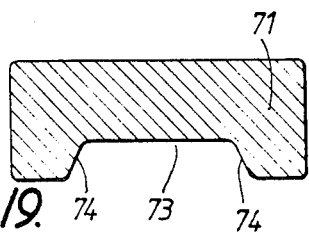
Figure 20:
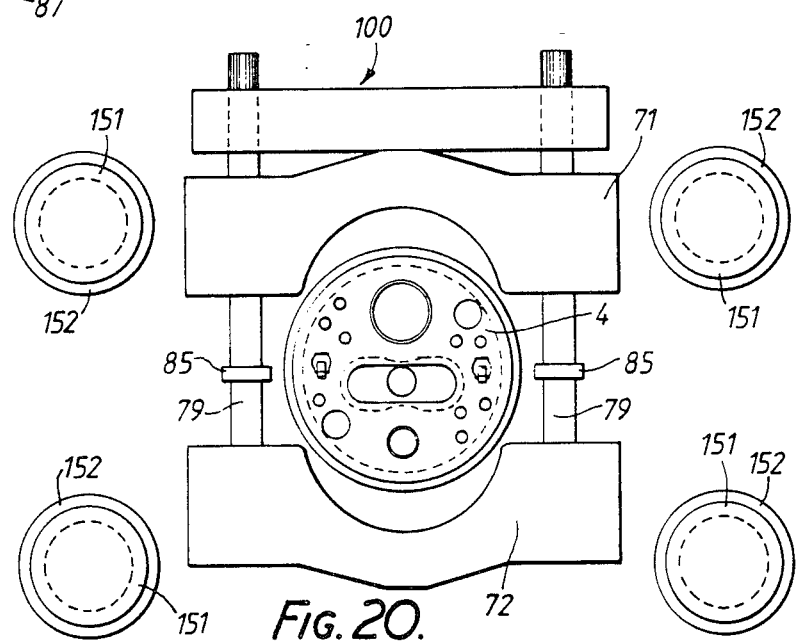
FIG. 20 is an end elevation of the hub of FIG. 1 with the clamp means and including an embodiment of engagement means according to the present invention.
Figure 21:
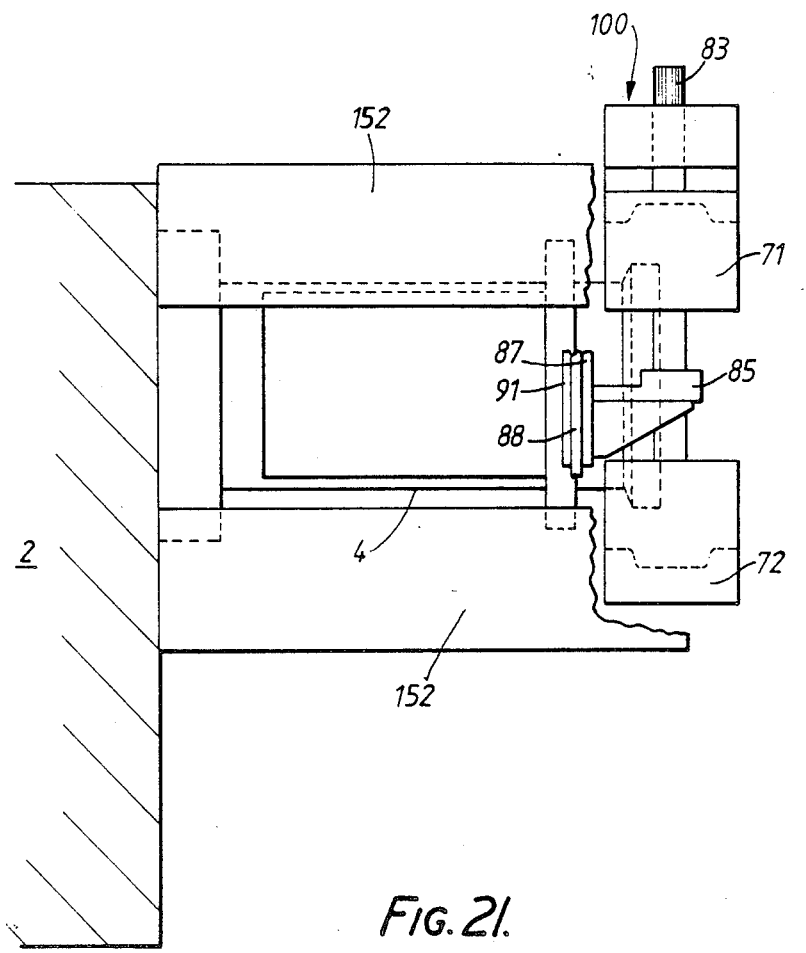
FIG. 21 is a side elevation of the assembly of FIG. 20.

When the hubs are not connected together, the seal plate 40 will normally be carried by one of the hubs 3, 4. For this purpose, the seal plate is provided with at least one, preferably two, latch means movable between two conditions in one of which the latch means latch the seal plate to one hub and in the other of which the latch means latch the seal plate to the other hub, means being provided for moving the latch means between their two conditions. Each latch means may be rotated between its two conditions with, for example, a bayonet type action for latching to a hub and pins engageable in helical grooves in an operating member in the FCM hub. Alternatively, as shown in FIG. 16, the latch means may be in the form of latches 60 pivotally mounted in openings 61 in the seal plate and projecting from both faces of the seal plate to be received in bores 62, 63 in the end portions of the hubs 3, 4. The bores 62, 63 are formed with lugs 64, 65 behind which end portions of the latches are engageable. Each latch 60 may be spring biassed to a position engaging the corresponding lug 65 of the CT hub and is disengageable therefrom and engageable with the corresponding lug of the FCM hub by operation of an operating member 66 mounted on the end of the piston of a double acting hydraulic cylinder 67 mounted in the bore 62 in the FCM hub and controlled from the FCM. Alternatively the latch 60 may be moved to a position engaging the CT hub by an operating member 66a corresponding to member 66 provided in bore 63 in the CT hub and mounted on the end of the piston of a double acting cylinder controlled by hydraulic fluid supplied via bores in the FCM hub and bores in the CT hub so that the operating member 66a can only be operated when the hubs are clamped together. Initially the seal plate 40 is supported on and latched to the FCM hub 4.

When axially aligned and juxtaposed with the interposition of the seal plate 40, the ends of the hubs 3, 4 are clamped together by a clamp 70 (FIGS. 17 to 23) which is adapted to engage around the shaped flanges 14, 30 at the ends of the hubs 3, 4 and urge them towards each other and into sealing engagement with the seals on the seal plate 40. The clamp comprises two members 71, 72, each of which encircles part of the periphery of the hubs and each of which is formed with a part circular groove 73 of generally Ushape with inclined or frusto-conical side surfaces 74 and which corresponds in shape to the overall shape of the hub flanges 14, 30 and interposed seal plate 40. The two members 71, 72 are as shown located one above and one below the hubs and are brought substantially simultaneously together around the hubs, causing progressive engagement of the frusto-conical surfaces 74 with faces 15,31 of the hub flanges to urge the flange of the CT hub towards the flange of the FCM hub. The members 71, 72 may alternatively be located one on each side of the hubs.

The clamp members 71, 72 have corresponding pairs of ears 75, 76 by which they are connected together. The ears of each pair of ears have aligned throughbores 77, 78 which receive elongate members 79. In the embodiment illustrated in FIGS. 17 to 23, the elongate members are in the form of bolts 79 which are threaded through threaded openings 80 in circular nuts 81 received in transverse blind bores 82 intersecting bores 77, 78 in each ear. The threads on the nuts in the pairs of ears are opposed so that, as each bolt 79 is rotated, the ears 75, 76 and clamp members are simultaneously moved together or apart. The nuts 81 are rotatable in the bores 82 and the bores 77, 78 are transversely larger than the bolts 79 to permit limited relative movement between the clamp members and bolts which may occur if the corresponding pairs of ears are moved apart or drawn together at different rates. The bolts 79 extend above the upper clamp member and are provided with end portions 83 suitable for engagement by a driving unit. The end portions 83 may for example be axially toothed or may be polygonal in section.

The clamp 70 is supported on the FCM in a position aligned with the end face of the FCM hub and with the groove 73 substantially centered on the seal plate 40, the seal plate being supported on the end face 10 of the FCM hub 4. For supporting the clamp 70 on the FCM, centrally between the ears 75, 76, each bolt 79 is provided with a flange 84 and is inserted through a corresponding opening in a support plate 85 which engages under the flange 84, a thrust washer 86 engaged on the other side of the flange being bolted to the plate 85. The support plates 85 extend to the FCM side of the clamp and each is fixed to, or formed integrally with, a base support member 87 (FIG. 18) mounted for limited movement relative to a fixed support member 88 which support member 88 is fixed relative to the FCM. The base support member 87 is slidable on the fixed support member 88 in a plane perpendicular to the axis of the FCM hub to permit limited adjustment of the position of the clamp in this plane. To limit movement of the support member 87 relative to fixed support member 88, member 87 is connected by bolts 90 to a second member 91, the support member 88 being received between members 87 and 91 with the bolts 90 passing through oversize holes 92 in support member 88. Limited adjustment of the position of the clamp in the direction of the axis of the FCM hub is provided by permitting the nuts 81 to move axially to a limited extent within their bores 82, the nuts 81 being biassed by springs 89 in one direction axially of the hubs.

As described above the clamp members 71, 72 are interconnected and moved together and apart by two bolts 79. In a modification, four bolts may be used, two bolts passing through each pair of ears 75, 76.

Figure 22:
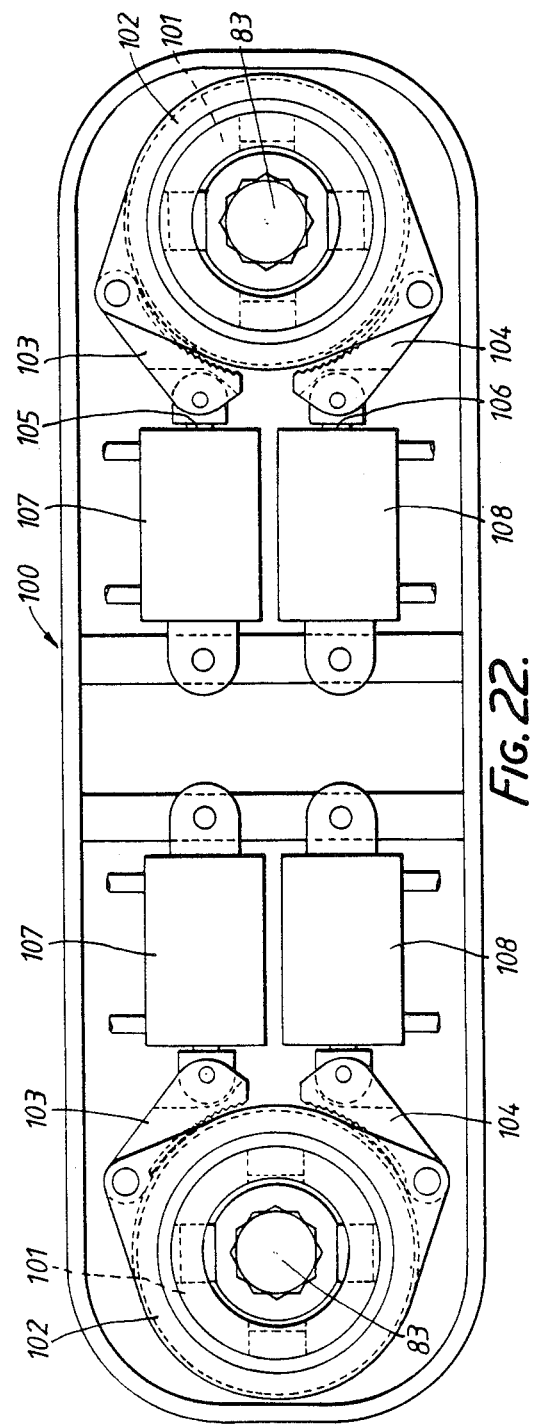
FIG. 22 is a plan view of an embodiment of a clamp actuating means, with part of the housing thereof omitted.
Figure 23:
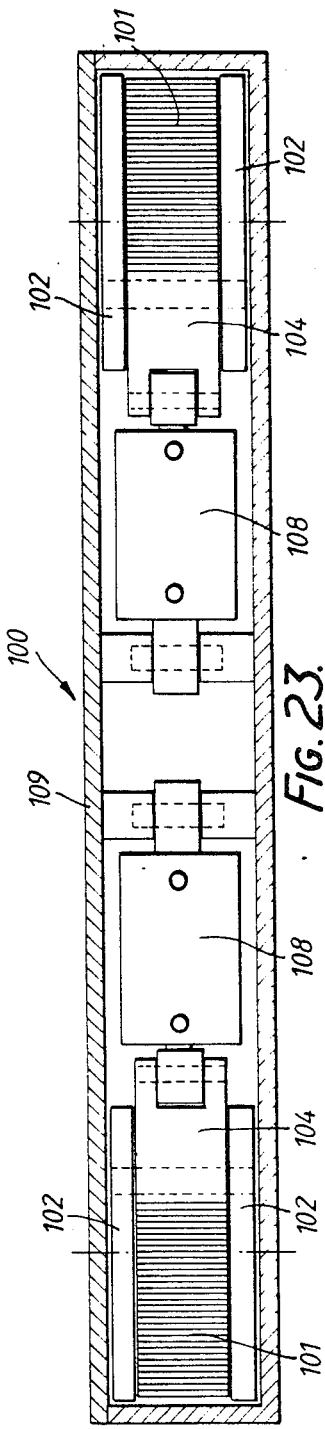
FIG. 23 is a side elevation of the clamp actuating means of FIG. 22, with part of the housing omitted.

The mechanism 100 for rotating the bolts of the clamp is mounted on the top of the clamp, is operated by hydraulic fluid supplied by the FCM and may take a variety of different forms. For example, it may be in the form of an hydraulic torque wrench, an example of which is shown in FIGS. 22 and 23. As shown, the upper end portion 83 of each bolt 79 is polygonal. A toothed wheel 101 is engaged on the end portion 83 of each bolt, the wheel being associated with an assembly 102 carrying two pawls 103, 104 pivoted on the assembly 102 for movement into and out of engagement with the teeth of the wheel. The pawls 103, 104 are connected to the pistons 105, 106 of pivotally mounted hydraulic cylinders 107, 108 for movement thereby, one pawl being provided for engaging the clamp around the hub flanges and the other for disengaging the clamp. In operation the appropriate cylinders are pressurised to cause the pistons to be extended. The connected pawls are first engaged with the teeth of the wheels and then further extension of the pistons causes rotation of the wheels and thereby of the bolts. At the end of travel of the respective piston it is retracted, the corresponding pawl is immediately freed from the teeth and returned to its initial position. This cycle is repeated until the clamp has been engaged or disengaged as required. Cyclic operation of the cylinder of the other pawl reverses the rotation.

The wheels 101, pawls 103, 104 and cylinders 107, 108 are mounted within a housing 109 which sits on top of the clamp, at least the lower wall of the housing being apertured to receive the end portions 83 of the bolts 79. Advantageously, the end portions 83 of the bolts 79 project through the upper wall of the housing to be engageable by an ROV or other drive means for operating the clamp means in the event of failure of the hydraulic torque wrench.

Figure 24:
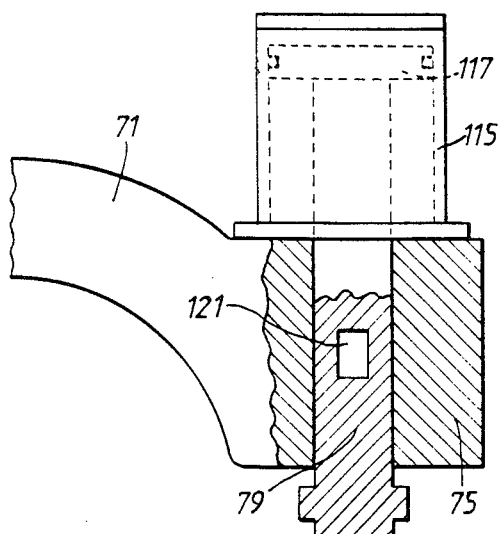
FIG. 24 is a part sectional part elevational view of another embodiment of clamp actuating means according to the present invention.
Figure 25:
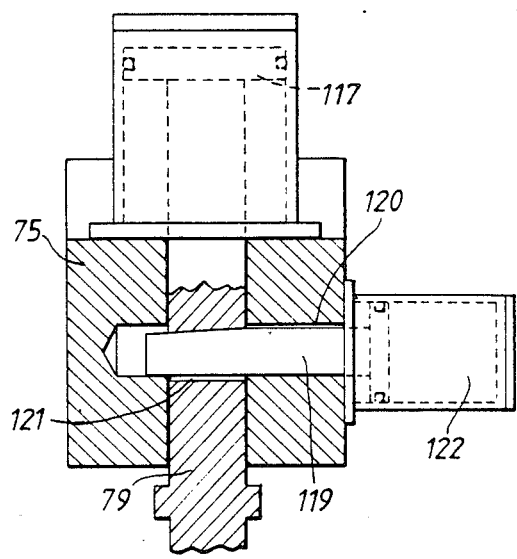
FIG. 25 is a section through part of the actuating means of FIG. 24.

It will be appreciated that there are a variety of other ways in which the clamp members 71, 72 can be drawn together and moved apart using elongate members extending through the ears 75, 76 of the members. An alternative system is shown in FIGS. 24 and 25. The ends of the elongate members 79 are connected to pistons 117, 118 of double acting hydraulic cylinders 115, 116 mounted on the ears. Supply of hydraulic fluid to one face of each piston draws the clamp members together and supply to the other face of each piston separates the clamp members. To prevent inadvertent release of the clamp members when they have been fully drawn together, a locking system may be provided which, as shown, comprises for each ear a locking wedge 119 which is inserted through a lateral bore 120 in each ear and into a correspondingly shaped opening 121 in the elongate member 79. Each wedge 119 may, as shown, be inserted under the control of a double acting hydraulic cylinder 122 mounted on the respective ear. When not in use the wedges 119 are retracted from the bores 77, 78.

Figure 26:
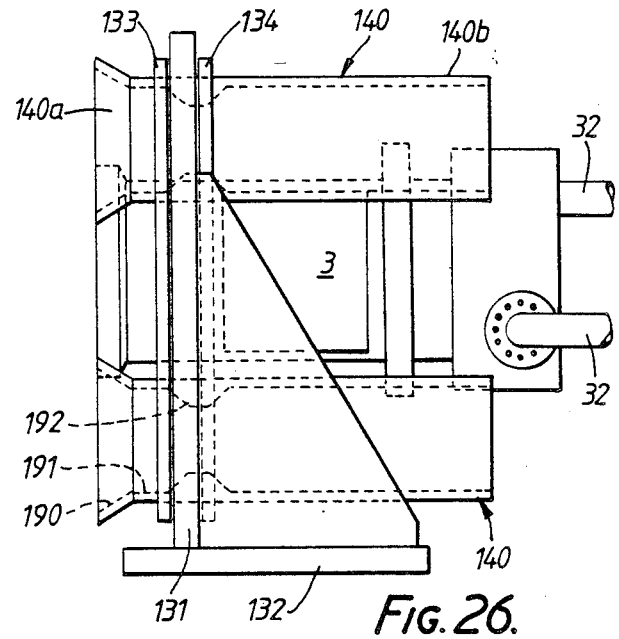
FIG. 26 is a side elevation of the hub of FIG. 6 and an embodiment of a supporting structure and engagement means according to the present invention.
Figure 27:
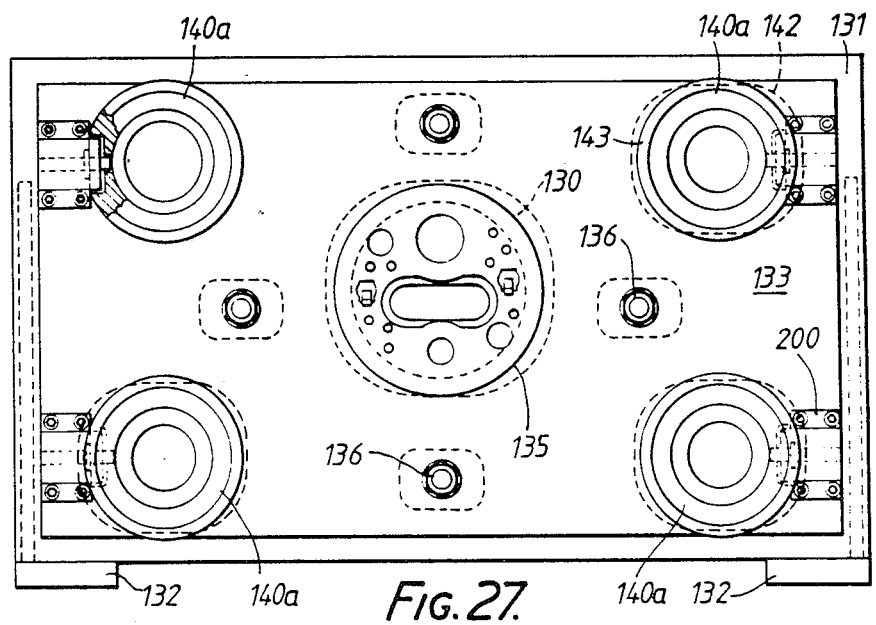
FIG. 27 is an end elevation of the assembly of FIG. 26.

The CT hub 3 is supported on the CT 1 (FIGS. 26 and 27) in such a way as to permit limited movement of the hub transversely and angularly so that it can be fully aligned with the fixed FCM hub. The CT hub is also initially axially restrained relative to its support on the CT but is releasable therefrom to permit it to be juxtaposed with the FCM hub. To this end, the CT hub 3 is arranged to extend through an oversize aperture 130 in a window plate 131 extending transversely of the hub, the aperture 130 being dimensioned to permit limited transverse and angular movement of the hub relative thereto, the dimensions being determined by manufacturing and installation tolerances. The window plate 131 is fixed to a mounting structure 132 fixed relative to the CT. Transversely extending guide plates 133, 134 are arranged one on each side of the window plate, the guide plates being provided with apertures 135 through which the hub extends and which are dimensioned so as to permit axial movement of the hub relative thereto. The guide plates move transversely with the hub and are interconnected by bolts 136 extending through similarly oversize openings in the window plate and provided with spacers ensuring clearance between the guide and window plates to permit relative transverse movement therebetween. Initially, the CT hub is axially retained or restrained relative to the guide plates.

Figure 28:
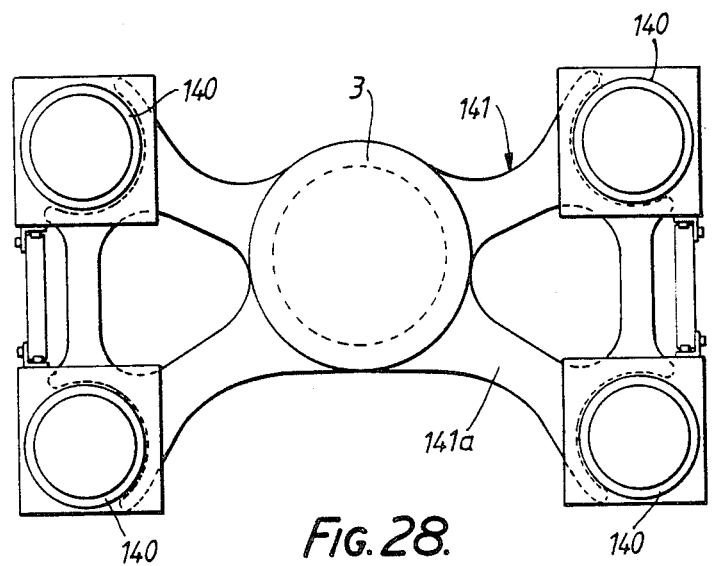
FIG. 28 is an end elevation of the hub of FIG. 6 showing the engagement means associated therewith and part of a supporting structure therefor.

Arranged around and fixed to the CT hub is a plurality of engagement means 140 for cooperating with engagement means 151 associated with and arranged around the FCM hub for aligning the CT hub with the FCM hub and for use in drawing the CT hub towards the FCM hub. As shown the CT hub engagement means 140 comprise hollow generally conical or inwardly tapering elements or guide cones 140a providing end portions of elongate tubular members 140b and for receiving engagement means in the form of generally conical or tapering elements associated with the FCM hub. As shown, four guide cones 140a are provided spaced around the CT hub, the FCM being provided with four corresponding conical elements as will be described hereafter. The tubular members 140b are interconnected by a rigid structure 141 (FIG. 28) which is also connected to the CT hub so that the hub and cones move together. As shown, the structure 141 comprises a pair of axially spaced plates 141a which are fixed to flanges 141b on the CT hub and to flanges on the members 140b. The members 140b also extend through openings 142, 143 in the window and guide plates 131, 133 and 134, the window and guide plates being arranged between plates 141a so as not to interfere with axial movement of the CT hub into juxtaposition with the FCM hub. The openings 142 in the window plate 131 are dimensioned to permit relative transverse and axial movement of the members 140b with the CT hub but the openings 143 in the guide plates 133, 134 have dimensions corresponding to the exterior dimensions of the members 140b so as to permit axial movement of the cones relative thereto but to cause the members 140b and guide plates to more transversely together. The openings 135 in the guide plates for the CT hub may have dimensions corresponding to the exterior dimensions of the hub or may be oversize. The CT hub will in any event move transversely with the guide plates because it is fixed to the members 140b.

Axial restraint of the CT hub 3 relative to the guide plates 133, 134 is provided by releasable restraining means which axially connect the leading guide plate 133 to the engagement means 140. The restraining means may be spring biassed detent type latches which are released by a sufficient axial force on the CT engagement means 140. Alternatively they may be released by means on the FCM engagement means.

The FCM engagement means 151 associated with the FCM hub comprise four generally conical elements 151a corresponding to the four cones 140a, and which form the end portions of four generally elongate cylindrical members in the form of pins 151b which are supported by but axially movable relative to the FCM and/or FCM hub.

Figure 29:
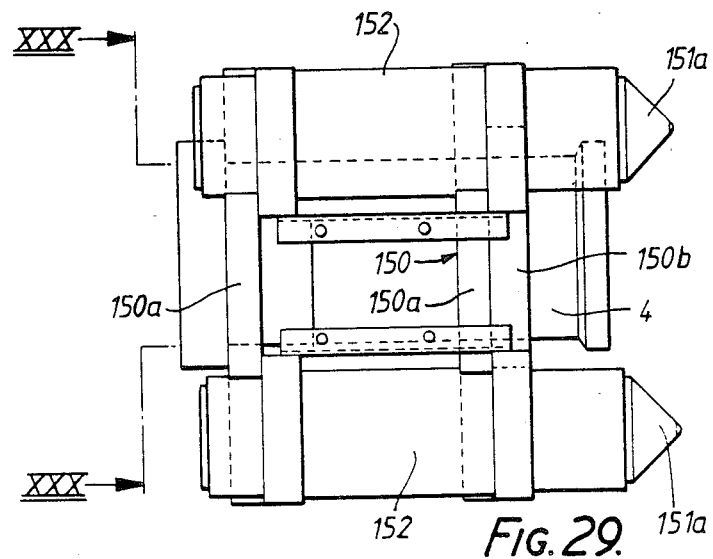
FIG. 29 is a side elevation of the hub of FIG. 1 with an embodiment of a supporting structure according to the present invention.
Figure 30:
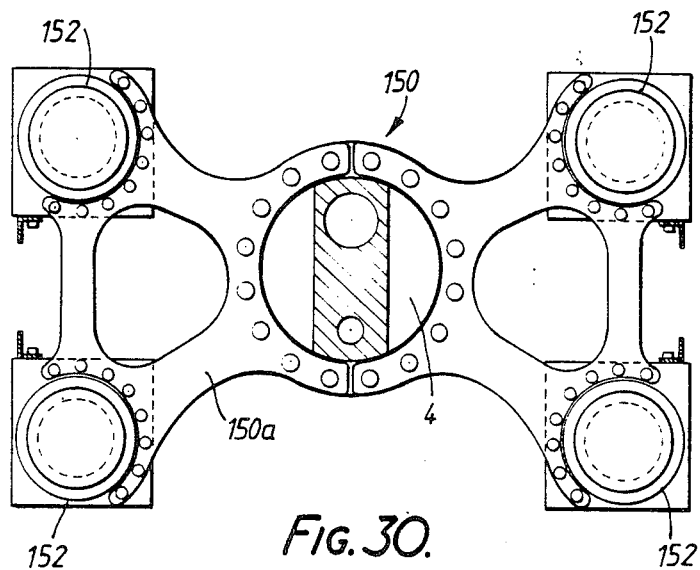
FIG. 30 is a section on the line XXX—XXX of FIG. 29.

The FCM and/or FCM hub carries a support structure 150 (FIGS. 29 and 30) for the pins 151b which comprises plates 150a similar to plates 141a, one plate 150a being bolted to flange 150b on the FCM hub and the other being bolted to the rear end of the FCM hub and may also be bolted to the FCM.

Figure 31:
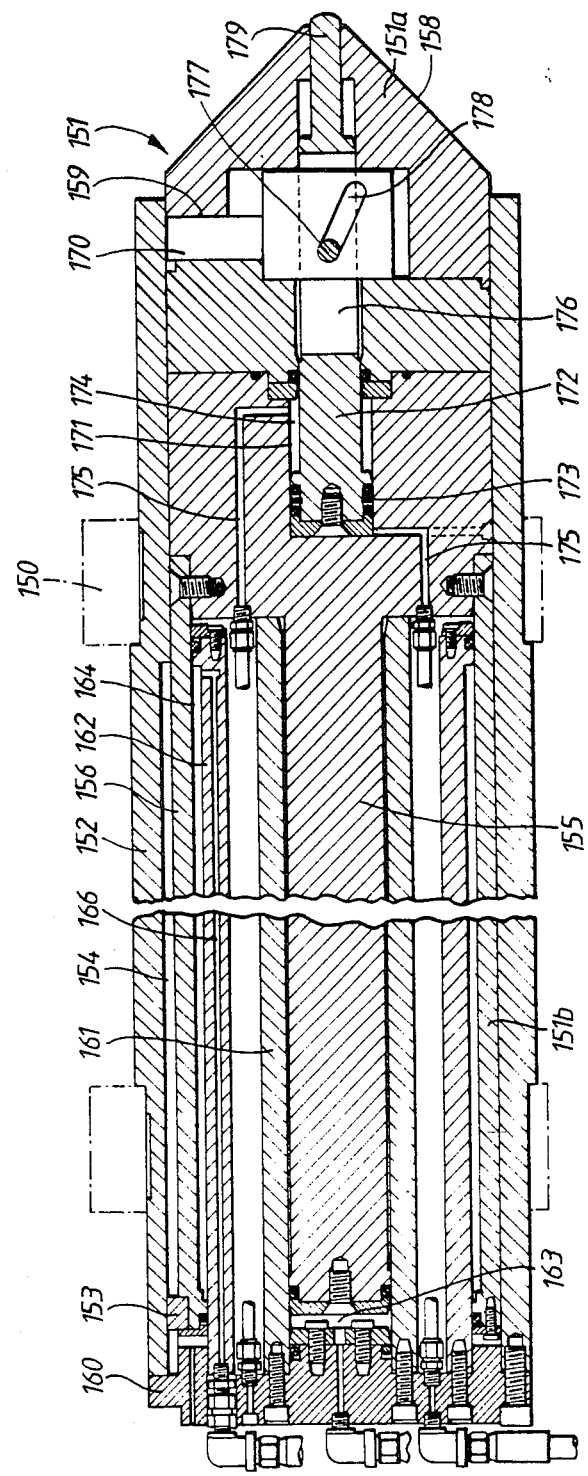
FIG. 31 is a section through an embodiment of an engagement means associated with the hub of FIG. 1 according to the present invention.

Each pin 151b (FIG. 31) is received in a guide sleeve 152 fixed to the support structure 150 and is axially movable relative thereto between retracted and extended positions relative to the FCM. In the extended positions, the conical elements engage in the cones of the CT hub to align the CT hub with the FCM hub. Angular movement of each pin 151b relative to its guide sleeve 152 is prevented for example by slidable engagement of a key 153 on the pin in an axial slot 154 in the guide sleeve 152. The body of each pin defines at least one annular space, comprises at its forward end the conical element and cooperates with a tubular coaxial structure extending within the pin from the base of the guide sleeve to define an hydraulic cylinder having two chambers to which hydraulic fluid is supplied through ducts in the base of the guide sleeve to cause extension and retraction of the pin. As shown in FIG. 31, the body of each pin comprises a central cylindrical portion 155 and a coaxial cylinder 156 defining therebetween an annular space closed at its forward end by the conical element 151a which provides the pin with a conical leading end surface 158 and has a transverse bore 159. The base 160 of the guide sleeve carries two coaxial cylinders 161, 162 received in the annular space between the co-axial cylinders 155, 156 and defining therewith a double acting hydraulic cylinder having a first chamber 163 defined between the base of portion 156 and cylinder 161 and a second chamber 164 defined between the cylinders 156 and 162, the cylinders 156 and 162 being provided with seal bearing flanges for sealing the chamber 164. Fluid is supplied to the chambers 163, 164 through ducts in the base of the guide sleeve and via duct 166 respectively in the cylinder 162. Supply of fluid to chamber 163 causes extension of the pin and supply of fluid to chamber 164 causes retraction of the pin.

When the conical elements and cones are engaged together and the hubs aligned, latch means latch the conical elements and cones together so that, when the axial restraint on the CT hub is removed, retraction of the conical elements will juxtapose the CT hub with the FCM hub. As shown, the latch means are associated with the conical elements and are movable under the control of fluid operated means into engagement with the cones.

In this embodiment, the transverse bore 159 in the conical element of each pin receives a latch member 170 movable between a retracted position and an extended position projecting transversely from the element 151a for engagement in an opening in the corresponding cone 140a for latching the two together when they are engaged. For movement of the latch member between its retracted and extended positions, the latch member 170 may define with the bore 159 two chambers of a double acting hydraulic cylinder which chambers are provided with hydraulic fluid through the base 160 of the guide sleeve and ducts extending within the pin, supply of fluid to one chamber causing extension of the member 170 and supply of fluid to the other chamber causing retraction of the latch member 170.

Alternatively the latch member may be moved transversely by a double acting cylinder acting axially of the pin, the action of the cylinder being translated into transverse movements of the member 170 by an appropriate linkage. Such an arrangement is shown in FIG. 31. As shown, the pin 151b defines an axial cylinder 171 in which a piston 172 is received, the piston defining two chambers 173, 174 supplied with hydraulic fluid through ducts 175 in the pin and base respectively and connected by flexible pipes extending within the annular space in the body of the pin. The outer end of the piston 172 has a transverse slot 176 through which the inner end of the latch member 170 extends and the two are coupled by a pin 177 fast with the piston and extending across the slot 176 and through an inclined slot 178 in the latch member such that axial movement of the piston is translated into radial movement of the latch member. The leading end of the piston may terminate in a release pin 179 which projects through the nose of the conical element 151a when the latch member 170 is in its extended position and forms the apex of the conical element when the latch member is in its retracted position. The projecting end of the pin is intended for engagement by a tool, in the event of jamming of the latch member 170 in its extended position, to force the piston 172 to its rearward position and so retract the latch member 170. If required, each guide sleeve 152 may carry a stop (not shown) which is normally retracted within an opening in the wall of the sleeve but is extensible into the path of the retracting pin by operation of an associated cylinder to limit retraction of the pin when engaged with the cone and the CT hub.

The pins 151 are powered from a single hydraulic source and are hydraulically connected in parallel. During extension of the pins they may travel at different rates depending on the frictional resistance to movement of each pin.

The interior of each cone 140a (FIGS. 28 and 34) is shaped to provide a frusto-conical entry portion 190 having a diameter which is sufficiently large that the conical element 151a of the corresponding pin 151b will be received in it even at the limits of manufacturing tolerances. The frusto-conical portion 190 is followed by a cylindrical portion 191 of a diameter slightly greater than that of the pins for receiving and engaging the cylindrical portion of the pin immediately rearward of the cone of the conical element, and a further frusto-conical portion 192 corresponding in shape to the leading surface 158 of the conical element. During connection of the hubs, the pins are driven forward until the leading surfaces 158 of the conical elements 151a are all fully engaged with and centered in the portions 192 of the cones, at which point the CT hub will be axially aligned with the FCM hub. The latch members 170 in the elements 151a will also be aligned with openings 195 (FIG. 34) in the cone walls and are then extended to latch the pins with the cones and therefore with the CT hub. The pins 151 are then retracted to pull the CT hub towards the FCM hub, once the axial restraint on the CT hub has been removed. The finally retracted positions of the pins, when engaged with the cones, may be determined by contact between the hubs and the seal plate, or by the stops associated with the pins, if provided.

Where the CT hub is axially restrained relative to the guide plates 133, 134 by spring biassed detents active between the engagement means 140 and guide plates, the force exerted by the retracting pins 151b overcomes the spring bias to release the engagement means 140 from the guide plates 133, 134. The CT hub may alternatively be restrained relative to the guide plates 133, 134 by restraining means acting between the engagement means 140 and guide plates which are disengaged by the latch members 170.

Figure 32:
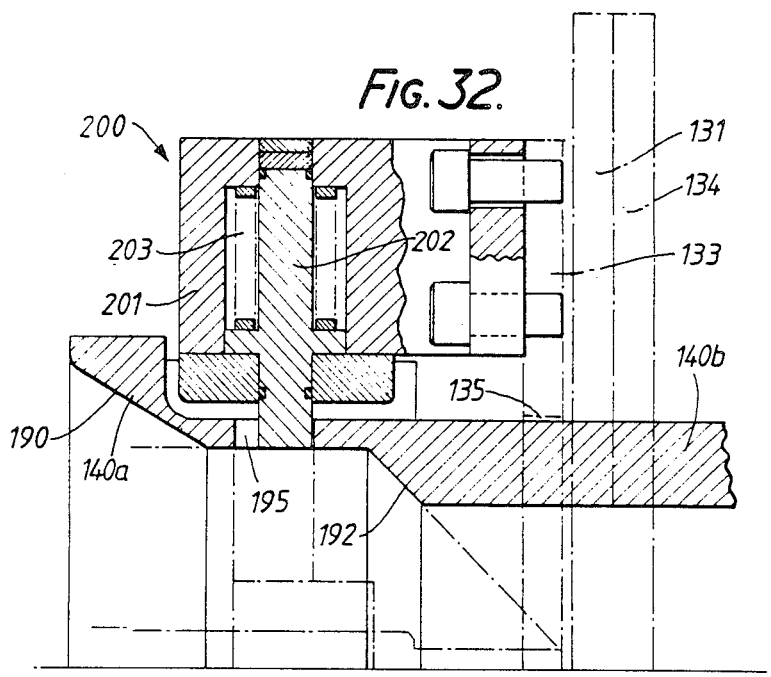
FIG. 32 is a section through the end of the engagement means of FIG. 26 showing an embodiment of axial restraining means according to the present invention.

One such arrangement is shown in FIG. 32. As shown also in FIG. 27, adjacent each opening 135 in guide plate 133 there is a restraining means 200 comprising a housing 201 mounted on the guide plate 133 and housing a bolt 202 biassed by a spring 203 outwardly of the housing into engagement with the opening 195 in the wall of the corresponding cone 140. When the corresponding conical element 151a is engaged in the cone, movement of the latch member 170 to its extended position to latch the conical element to the cone pushes the bolt 202 out of the opening 195 back into the housing 201 to disengage the cone from the guide plate 133.

Figure 33:
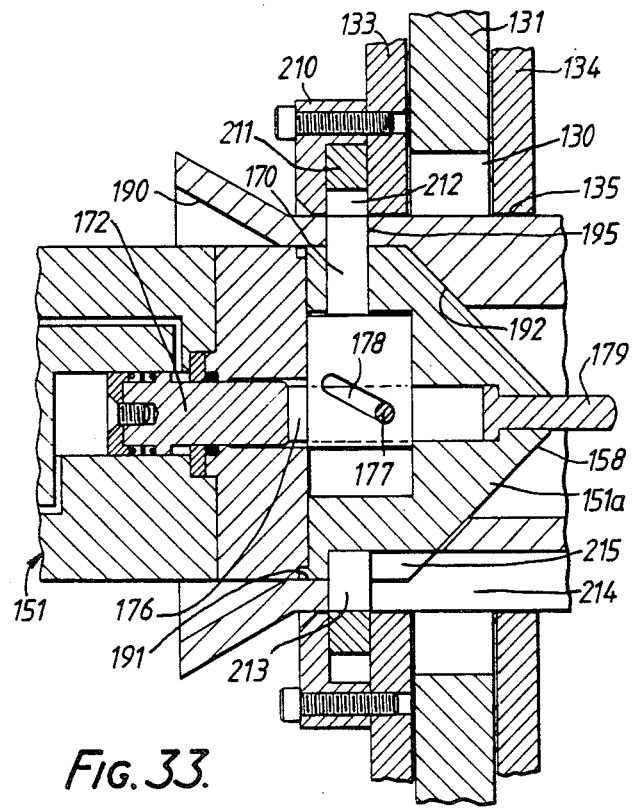
FIG. 33 is a section through the end of the engagement means of FIG. 31 when engaged with the engagement means of FIG. 26, and showing another embodiment of axial retaining means.
Figure 34:
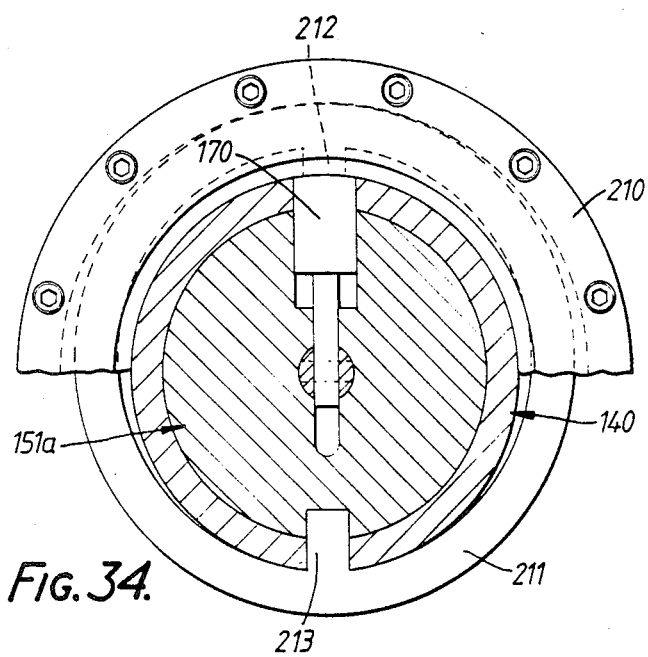
FIG. 34 is a part transverse section part end elevation through the means of FIG. 33.

Another arrangement is shown in FIGS. 33 and 34. Around each opening 135 in the guide plate 133 there is a housing 210 for an annular element 211 carrying at two diametrically opposed locations radially inwardly extending lugs 212, 213. The annular element 211 has a greater diameter than the part of the cone it surrounds and is movable in the direction of the diameter of the lugs between one position in which lug 212 is engaged in the opening 195 in the wall of the cone and a second position in which the one lug has been withdrawn from opening 195 and the other lug 213 enters the end of an axial slot 214 in the cone. In the one position of the annular element 211, the cone is axially retained relative to the guide plate 133 and in the other position the cone can move axially relative to the guide plates, the lug 213 sliding along the slot 214. Thus when the latch member 170 is inserted into the opening 195 it displaces the lug 212 from the opening freeing the cone from axial restraint and moving the annular member to its other position. The conical element of each pin is cut away at 215 so that the lugs 213 do not interfere with retraction of the pins with the cones and CT hub.

Figure 35:
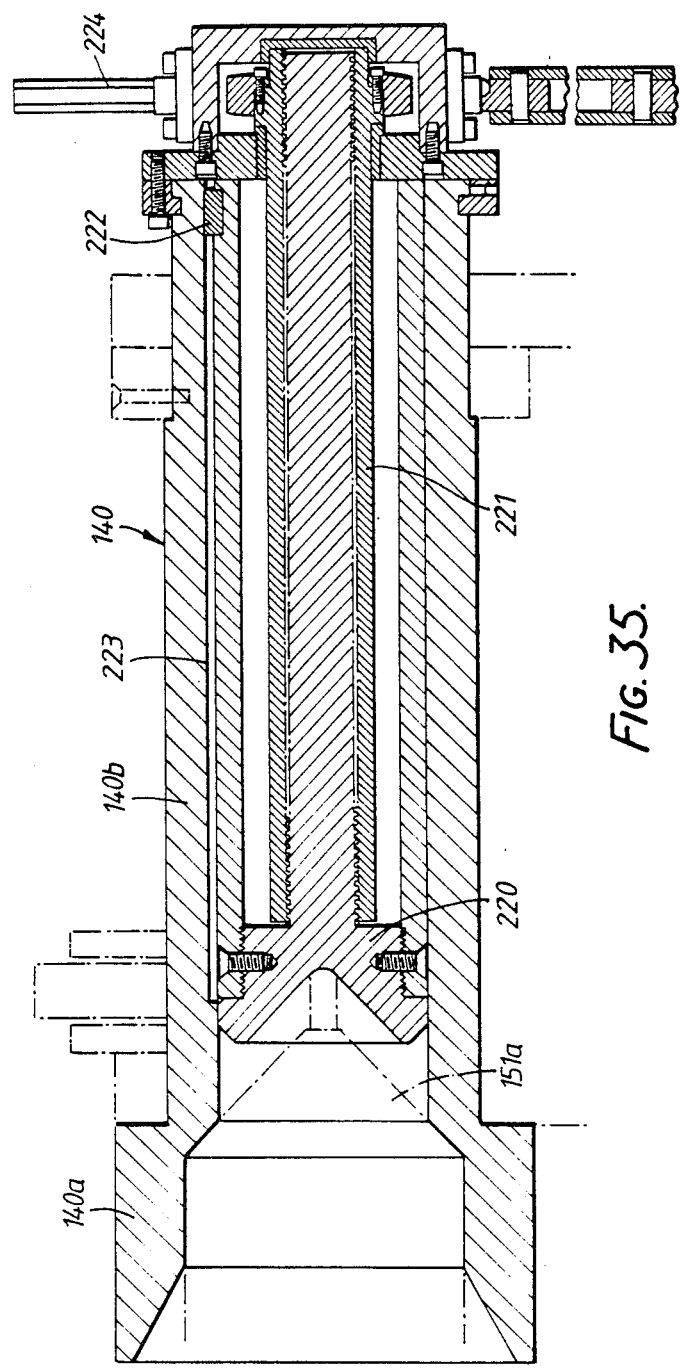
FIG. 35 is an axial section through the engagement means of FIG. 26 showing an embodiment of a release tool for releasing the engagement means according to the present invention.

For use in the event of failure of the above described systems to release the latch members 170 from engagement with the cones, when it is required to do so, there is provided an independently operable system comprising release tools associated with each cone. Each release tool is in the form of a cylinder 220 (FIG. 35) slidable in the respective tubular member 140b from a retracted inoperative position forwardly to push the release pin 179 back into the conical element 151a to force the cylinder 172 backwardly and so retract the latch member 170 and move it out of engagement with the cone. Further movement of the cylinder 220 causes the pin to be pushed out of the cone. For moving the cylinder 220, it may be threaded onto a threaded body 221 which is rotatable, the cylinder 220 being prevented from rotation by a key 222 engaging in a key way 223 in the wall of the tubular member 141b. Body 221 is arranged to be rotated by an ROV or other drive means which is coupled, as and when required, to a splined shaft 224 projecting from the rear end of the tubular member 141b.

In normal operation, when the pins have been fully retracted to bring the hubs into juxtaposition with the interposition of the seal plate, where provided, the clamp means is then operated to clamp the hubs together. Once clamped together, the pins can be released from the cones by retraction of the latch members and fully retracted into the guide sleeves. If it is required to move the hubs apart after they have been clamped together, e.g. to release the seal plate for replacement or inspection, the pins are partially extended to bring the conical elements into the cones, the clamp is disengaged from the hub flanges, and the pins are then fully extended to move the CT hub away from the FCM hub. The seal plate may remain supported on the FCM hub or may be moved with the CT hub depending on the condition of the latch means in the seal plate when the hubs are separated.

Although as described above, the CT hub is movable and the FCM hub is fixed, it will be appreciated that the CT hub could be fixed to the CT and the FCM hub would be movable and would then be associated with the window and guide plates.

While the connection assembly described above has been described in relation to the connection of fluid carrying and electrical lines of a Christmas Tree and a fluid control module or an assembly of fluid control modules positioned adjacent the Christmas Tree, it will be appreciated that the connection assembly is equally applicable to the connection of such lines between other sub-sea assemblies. Additionally, while as described above, the cones are fixed relative to the movable hub and the conical elements are mounted on the fixed hub for movement relative thereto, it will be appreciated that the cones could alternatively be mounted on the ends of the elongate engagement members associated with the fixed hub for movement relative thereto for engagement with the conical elements which would then be fixed relative to the movable hub. Furthermore, while as described above the active components of the apparatus are all associated with the fixed hub, this is because the fixed hub is the FCM hub and the FCM is the source of control fluid. In other circumstances, the hub associated with the supply of control fluid may be the movable hub so that the active components would then be associated with the movable hub.

What is claimed is:

1. In combination with a first hub which defines an axis and which has a first end face and a plurality of first fluid lines that extend to said first end face in a first pattern, and a second hub which defines an axis and which has a second end face and a plurality a second fluid lines that extend to said second end face in a second pattern, said second pattern being a mirror image of said first pattern, an apparatus for connecting said first hub and said second hub such that said axes thereof will be coaxial and said first and second end faces will be oriented such that said first and second patterns will be in register and said first fluid lines can communicate with said second fluid lines, said apparatus comprising a plurality of first engagement members, first mounting means for fixedly mounting said first engagement members around said axis of said first hub in a third pattern, a plurality of second engagement members, second mounting means for movably mounting said second engagement members around said axis of said second hub in a fourth pattern, said fourth pattern being a mirror image of said third pattern, said second engagement members being movable in the direction of said axis of said second hub from a retracted position to an extended position where they are engageable with said first engagement members, thereby causing said first and second hubs to become oriented such that said first and second patterns will be in register and said first and second fluid lines will be aligned with each other, means for moving said second engagement members between their retracted and extended positions, and latch means for latching said engaged first and second engagement members together so that movement of said second engagement members towards said retracted position will cause said first and second hubs to become juxtaposed.

2. Apparatus as claimed in claim 1, wherein said first engagement members comprise a plurality of generally conical elements arranged by said first mounting means around said first hub and said second engagement members comprise a plurality of generally correspondingly shaped receptor elements arranged by said second mounting means around said second hub, said conical elements being receivable and engageable in said receptor elements to axially align said hubs.

3. Apparatus as claimed in claim 2, wherein said latch means comprise a latch member mounted in each said conical element, each latch member being movable between an extended operative position and a retracted inoperative position and each associated with a piston of a cylinder defined within the respective said engagement member.

4. Apparatus as claimed in claim 2, wherein said second engagement members comprise elongate members arranged with their axes extending generally parallel to said axis of said second hub, provided at their ends with corresponding elements, and which are movable axially relative to said second hub between their retracted and extended positions.

5. Apparatus as claimed in claim 4, comprising guide means fixed relative to said second hub for guiding said elongate members in their movement between their extended and retracted positions relative to said second hub.

6. Apparatus as claimed in claim 5, wherein said means for moving said second engagement members comprise cylinder and piston means defined by said guide means and said elongate members.

7. Apparatus as claimed in claim 1, wherein said first and second engagement members respectively comprise a plurality of elongate members arranged around each said hub with their axis generally parallel to said axis of said respective first and second hubs and having end portions forming elements which are engageable together for axially aligning said hubs.

8. Apparatus as claimed in claim 7, wherein said elements of said elongate members associated with one said hub are generally conical and said elements of said elongate members associated with the other said hub have generally correspondingly shaped cavities for receiving said conical elements.

9. Apparatus as claimed in claim 7, comprising guides fixed relative to said second hub and receiving said elongate members of said second engagement members, said elongate members of said second engagement member at least in part defining internally chambers for fluid for moving said elongate members relative to said guides.

10. Apparatus as claimed in claim 1, wherein said latch means comprise latch members carried by said engagement members associated with one of said hubs and which are movable transversely relative thereto between retracted inoperative positions and extended operative positions for engaging in openings provided in said engagement members associated with the other said hub, and means are provided for moving said latch members between their operative and inoperative positions.

11. Apparatus as claimed in claim 10, wherein each said latch member is movable transversely of the respective said conical element and said associated piston is movable axially of said engagement member and is coupled to the respective said latch member by means for converting axial movement into transverse movement.

12. Apparatus as claimed in claim 11, wherein each said piston carries a rod coaxial with the respective said engagement member and which projects beyond the end of said conical element thereof when said latch member is in its operative position, for engagement by a separate release tool for causing retraction of said latch member in the event of failure of operation of said cylinder and piston.

13. Apparatus as claimed in claim 12, comprising a release tool in respect of each said latch member, mounted in said engagement members associated with the said other hub, and movable into engagement with the projecting ends of said piston rods when said engagement members are engaged and latched together.

14. Apparatus as claimed in claim 1, wherein fluid operated means are provided for operating said latch means and said means for moving said second engagement members are fluid operated, means being provided for supplying fluid thereto associated with said second hub.

15. Apparatus as claimed in claim 1, wherein one of said hubs is fixed relative to a fixed structure and said other hub is initially movable relative thereto, and means are provided for axially restraining said other hub in its initial position while permitting limited transverse movement thereof.

16. Apparatus as claimed in claim 15, wherein said restraining means comprises first and second plate means extending transversely of said other hub and through which said other hub extends, said first plate means being fixed relative to said one hub and permitting axial and limited transverse movement of said other hub relative thereto to permit said hubs to be axially aligned, said second plate means being axially restrained relative to said first plate means but transversly movable with said other hub relative thereto, means being provided for axially restraining said other hub relative to said second plate means, said axially restraining means being releasable to permit said other hub to be moved axially to be juxtaposed with said one hub.

17. Apparatus as claimed in claim 16, wherein said engagement members associated with said other hub extend through said first and second plate means and are axially restrained by said second plate means while being movable transversely relative to said first plate means with said other hub.

18. Apparatus as claimed in claim 17, wherein said axially restraining means are mounted on said second plate means, act on said engagement members associated with said other hub and are releasable by operation of said latch means to latch said engagement members together.

19. Apparatus as claimed in claim 17, wherein said axially restraining means are mounted on said second plate means and comprise a bolt in respect of each engagement member associated with said other hub, and biassing means biassing said bolt into engagement with the respective said engagement member.

20. Apparatus as claimed in claim 18, wherein each said bolt is biassed into engagement in an opening in said respective engagement member associated with said other hub, which opening is engaged by said latch means when said engagement members are engaged together to disengage said engagement members associated with said other hub from said axially restraining means.

21. Apparatus as claimed in claim 1, comprising clamp means for clamping said juxtaposed hubs together and support means for supporting said clamp means relative to one of said hubs so as to be substantially aligned with the end of said one hub.

22. Apparatus as claimed in claim 21, wherein said support means for said clamp means is adapted to permit limited movement of said clamp means transversely and axially of said one hub.

23. Apparatus as claimed in claim 22, wherein said one hub is said second hub.

24. Apparatus as claimed in claim 1, comprising seal plate means for location between the ends of said hubs to be connected together and carrying seals for sealing between the ends of said lines in said hubs, said seal plate means being carried by one of said hubs.

25. Apparatus as claimed in claim 24, comprising seal plate latch means for latching said seal plate to one of said hubs, said seal plate latch means being mounted in said seal plate means.

26. Apparatus as claimed in claim 25, wherein said seal plate latch means is movable between a first position engaging said one hub and a second position engaging said other hub, and fluid operatied means are provided for moving said seal plate latch means.

27. Apparatus as claimed in claim 26, wherein said seal plate latch moving means are provided in both hubs, said seal plate latch moving means in one of said hubs being connected to be provided with fluid through the other said hub so that it is only operable when said hubs are connected together.

28. Apparatus as claimed in claim 26, wherein said other hub is said second hub.

29. Apparatus as claimed in claim 1, wherein said first hub is associated with a first fixed structure and movable relative thereto to a limited extent and said second hub is fixed to a second structure fixed relative to said first structure, at least some of the lines for fluid terminating in said hubs being connected to the respective structure.

30. Apparatus as claimed in claim 1, wherein each hub comprises a generally elongate body through which a plurality of bores extend and open into a generally planar end connection face for connection to the corresponding face of the other hub, said end connection face of said hub being provided with a flange for engagement by clamping means, and, intermediate the ends of the body, the body of each hub is cut back to provide a face opposed to the connection face and into which at least some of the bores in the hub open.

* * * * *